Nov. 8, 1955  D. C. DOTY  2,723,152
FISHING GAFFS
Filed Oct. 7, 1952
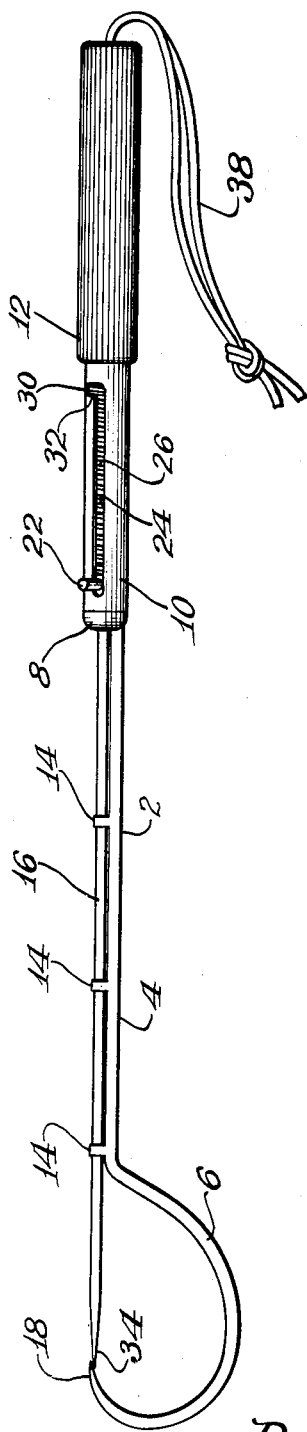
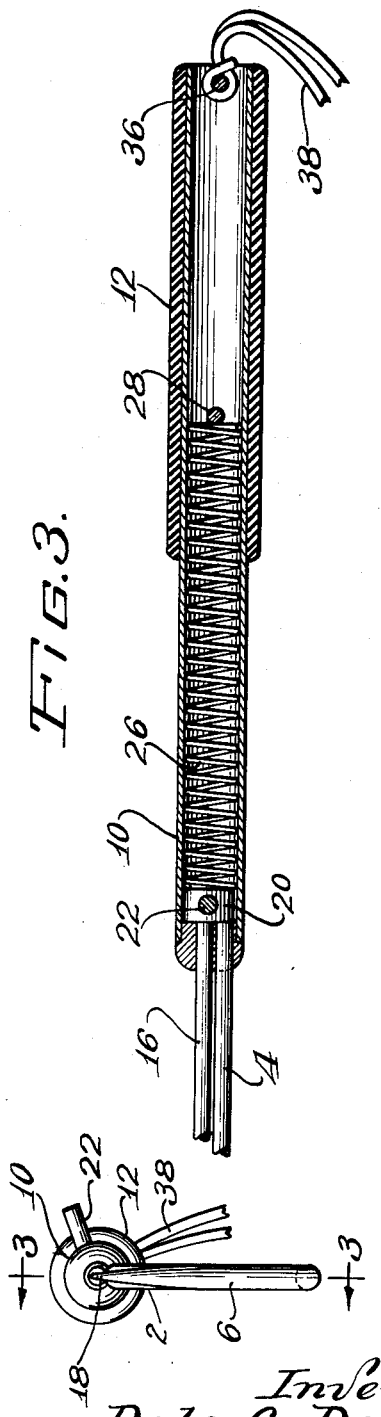
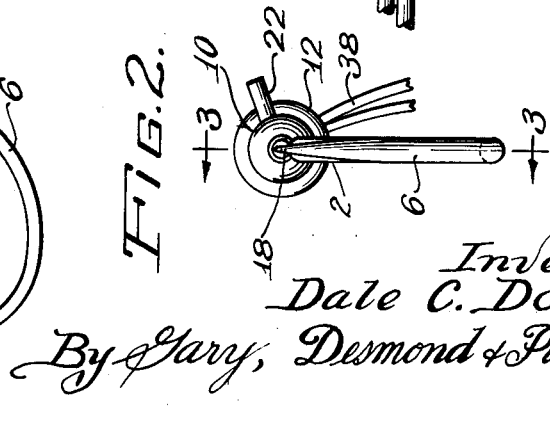
Inventor:
Dale C. Doty
By Gary, Desmond & Parker
Attys

United States Patent Office 2,723,152
Patented Nov. 8, 1955

2,723,152

FISHING GAFFS

Dale C. Doty, Cary, Ill.

Application October 7, 1952, Serial No. 313,413

1 Claim. (Cl. 294—26)

This invention relates to fishing gaffs and more particularly to a gaff embodying a keeper rod movable into and out of engagement with the hook end of the gaff.

Briefly, the present invention comprises a gaff member having an elongated shank provided at one end thereof with a handle and at the other end with a pointed hook, the jaw, gill or other portion of a fish being secured on the hook end of said member by means of a keeper rod mounted for reciprocative movement along the gaff member shank and having a sharply pointed end adapted to penetrate the fish and then to engage the pointed hook end of the gaff member.

This invention further contemplates the provision of a fishing gaff embodying a spring-actuated, trigger-controlled keeper rod adapted to be latched in its cocked or retracted position, the rod being manually released by the thumb of the user for rapid movement toward and into overlapping engagement with the pointed hook end of the gaff member to form therewith a closed ring.

This invention further contemplates the provision of a fishing gaff of the type described adapted to be manipulated with only one hand to cock or retract, and then release the spring-actuated keeper rod for forward movement into overlapping engagement with the pointed hook end of the gaff member to gaff a fish.

A further object of this invention is to provide a fishing gaff which, in use, does not seriously injure the mouth or gill area of a fish, as some fishermen prefer to release some of the fish after removal of the plugs or hooks from the mouths of the fish.

Another object is to provide a fishing gaff with a wrist strap loop or leash adapted to encircle the wrist of the user and to be removed for engagement around an oar lock or other part of a boat when the gaffed fish is to be left temporarily within the water.

Another object of this invention is to provide a fish gaff which is relatively simple and inexpensive in construction, reliable in use, and which will not readily get out of order.

This invention embodies other novel features, details of construction and arrangement of parts which are hereinafter set forth in the specification and claim and illustrated in the accompanying drawing, wherein:

Fig. 1 is a side elevational view illustrating a fishing gaff embodying the features of the present invention.

Fig. 2 is an end view of same.

Fig. 3 is an enlarged longitudinal sectional view illustrating the handle end of the fishing gaff.

Referring now to the drawing for a better understanding of this invention, the fishing gaff is shown as comprising a gaff member 2 formed of rod stock to provide an elongated shank 4 having a hook 6 formed on one end thereof. The other end of the shank 4 is welded, brazed or otherwise secured to a barrel cap 8 sleeved into one end of a cylindrical barrel 10 and welded or brazed thereto. A rubber sleeve 12 is secured upon the other end of the barrel 10 for engagement by the hand of the user in gaffing a fish.

A plurality of bushings 14 are welded, brazed or otherwise secured at spaced intervals along the shank 4 of the gaff member and formed with axially aligned apertures to slidably receive a keeper rod 16 for axial reciprocative movement toward and away from the sharp, pointed end 18 formed on the hook 6. A collar 20 is welded, brazed or otherwise secured to one end of the keeper rod 16 for movement into and out of engagement with the barrel cap 8, the collar being provided with an actuating rod 22 projecting outwardly through an elongated slot 24 formed in the barrel.

A helical compression spring 26 is enclosed within the barrel 10 between the collar 20 and an abutment pin 28 which extends through diametrically opposed apertures formed in the barrel. The end of the slot 24 adjacent the rubber sleeve 12 extends laterally at 30 to provide an abutment shoulder 32 to engage the rod 22 when the latter is in its cocked or retracted position to compress the spring 26. As illustrated in Fig. 1, the keeper rod 16 is formed with a sharp, pointed end 34 for overlapping engagement with the pointed end 18 of the hook 6 to form therewith a loop or ring when the keeper rod is urged in a forward direction by the compression spring 26.

In the operation of the fishing gaff, the keeper rod 16 is moved to its cocked or retracted position by moving the actuating rod 22 along the slot 24 and then laterally into engagement with the abutment shoulder 32. After the jaw, gill or other portion of a fish has been disposed between the pointed ends 18 and 34 of the gaff, movement of the actuating rod 22 away from the abutment shoulder 32 permits the spring 26 to move the keeper rod 16 rapidly through the selected portion of the fish and into overlapping engagement against the pointed end 18 of the hook 6 to form therewith a complete loop or ring to prevent disengagement of the fish from the gaff. After a fish has been secured on the gaff in the manner thus described, it is possible to remove a plug or hook from the fish's mouth without difficulty; after which, the fish may be lifted into the boat or released, as desired.

A pin 36 is secured within diametrically opposed apertures formed in the end of the barrel 10 for engagement by a loop 38 of flexible strip material, such as rawhide, the loop providing an opening to receive the hand of the user and to encircle the wrist to prevent loss of the gaff into the water during gaffing of the fish. After a fish has been secured on the gaff the loop 38 may be employed for engagement with an oar lock or other part of a boat if it is found desirable to leave the fish in the water for subsequent removal therefrom.

While this invention has been shown in but one form it is obvious to those skilled in the art that it is not so limited but is susceptible of various changes and modifications without departing from the spirit and scope of the claimed invention.

I claim as my invention:

In a fishing gaff, a tubular barrel having a tubular hand gripping sleeve engaged over and extending along one end thereof and having a cap formed with an axial bore secured on the other end, a gaff member formed of round rod stock secured in fixed position on and projecting from said cap parallel with the axis of said barrel, a hook formed on the outer end of said gaff member and having a pointed end free of barbs to engage a fish, a keeper rod formed of round rod stock extending through said base and having a pointed end for overlapping engagement with the pointed end of said hook, an abutment member housed for reciprocative movement in said barrel and secured to the inner end of said keeper rod for engagement against said cap when the pointed end of the rod is engaged against the pointed end of said hook, an actuating arm secured on said abutment member and projecting through a slot in the wall of said barrel, guide bearings on said gaff member to slidably receive said keeper rod, the wall of said barrel being formed with an abutment shoulder at the inner end of and offset laterally from said slot to engage said actuating arm when the keeper rod is moved away from said hook and rotated about its axis, and a compression spring housed in said barrel to move said keeper rod toward said hook when said actuating arm is manually moved out of engagement with said abutment shoulder into registry with said slot, said actuating arm being adjacent said hand gripping sleeve and operable by the thumb of the user when said arm is engaged by said shoulder.

References Cited in the file of this patent

UNITED STATES PATENTS

| | | |
|---|---|---|
| 611,400 | Wenger | Sept. 27, 1898 |
| 760,181 | Buschemeyer | May 17, 1904 |
| 845,180 | Krafft | Feb. 26, 1907 |
| 1,072,672 | Sweet | Sept. 9, 1913 |
| 1,604,725 | Sprangel | Oct. 26, 1926 |
| 2,539,563 | Baloun | Jan. 30, 1951 |
| 2,619,759 | Penninger | Dec. 2, 1952 |